United States Patent
Eriksson et al.

(10) Patent No.: US 7,716,474 B2
(45) Date of Patent: May 11, 2010

(54) ANTI-PIRACY SOFTWARE PROTECTION SYSTEM AND METHOD

(75) Inventors: Thomas Eriksson, Balsta (SE); Jurgen Wenzel, Isafjordsgatan (SE); Tobias Karlsson, Isafjordsgatan (SE)

(73) Assignee: ByteBlaze, Inc., San Francisco, CA (US)

(*) Notice: Subject to any disclaimer, the term of this patent is extended or adjusted under 35 U.S.C. 154(b) by 832 days.

(21) Appl. No.: 10/844,565

(22) Filed: May 11, 2004

(65) Prior Publication Data

US 2005/0044359 A1 Feb. 24, 2005

Related U.S. Application Data

(60) Provisional application No. 60/470,062, filed on May 12, 2003.

(51) Int. Cl.
*H04L 9/00* (2006.01)

(52) U.S. Cl. .............. 713/165; 713/155; 713/185; 713/193; 726/22; 726/10; 726/30; 380/201

(58) Field of Classification Search ................. 713/165
See application file for complete search history.

(56) References Cited

U.S. PATENT DOCUMENTS

| | | | | |
|---|---|---|---|---|
| 4,593,353 | A | 6/1986 | Pickholtz | 364/200 |
| 5,499,295 | A | 3/1996 | Cooper | 380/23 |
| 5,715,403 | A * | 2/1998 | Stefik | 705/44 |
| 5,790,664 | A * | 8/1998 | Coley et al. | 709/203 |
| 6,047,242 | A * | 4/2000 | Benson | 702/35 |
| 6,049,789 | A | 4/2000 | Frison et al. | 705/59 |
| 6,063,134 | A | 5/2000 | Peters et al. | 717/11 |
| 6,108,420 | A | 8/2000 | Larose et al. | 380/4 |
| 6,134,659 | A | 10/2000 | Sprong et al. | 713/190 |
| 6,151,707 | A | 11/2000 | Hecksel et al. | 717/11 |
| 6,169,976 | B1 | 1/2001 | Colosso | 705/59 |
| 6,189,146 | B1 | 2/2001 | Misra et al. | 717/11 |
| 6,289,455 | B1 | 9/2001 | Kocher et al. | 713/194 |
| 6,301,707 | B1 | 10/2001 | Carroll et al. | 717/11 |
| 6,327,707 | B1 | 12/2001 | McKeeth et al. | 717/11 |
| 6,334,189 | B1 | 12/2001 | Granger et al. | 713/200 |
| 6,460,140 | B1 * | 10/2002 | Schoch et al. | 726/22 |
| 6,480,959 | B1 | 11/2002 | Granger et al. | 713/189 |
| 6,640,305 | B2 | 10/2003 | Kocher et al. | 713/194 |
| 6,678,665 | B1 * | 1/2004 | Benson et al. | 705/51 |
| 6,681,212 | B1 | 1/2004 | Zeng | 705/51 |
| 6,857,067 | B2 * | 2/2005 | Edelman | 713/155 |

(Continued)

*Primary Examiner*—Kambiz Zand
*Assistant Examiner*—Yonas Bayou
(74) *Attorney, Agent, or Firm*—Dergosits & Noah LLP

(57) ABSTRACT

A method and system for protecting software products from unauthorized use and distribution is described. The system comprises a client process executed on a client computer coupled to a producer computer over a network. The method comprises the steps of providing to a user a copy of the distributed software, the distributed software comprising an incomplete executable program requiring a security module to be installed prior to execution on the client computer. The user receives a registration code for use with the distributed software. Upon attempted execution of the distributed software the producer computer requests user registration from the user. Upon receipt of the registration information including the registration code from the user, the producer computer validates the registration code and constructing a security module for transmission to the client computer. The security module is integrated with the distributed software to allow execution of the executable program.

19 Claims, 10 Drawing Sheets

U.S. PATENT DOCUMENTS

| | | | |
|---|---|---|---|
| 2001/0034846 A1* | 10/2001 | Beery | 713/201 |
| 2001/0051928 A1* | 12/2001 | Brody | 705/52 |
| 2002/0066032 A1 | 5/2002 | Kurumida | 713/201 |
| 2002/0091644 A1 | 7/2002 | Wong et al. | 705/59 |
| 2002/0107809 A1 | 8/2002 | Biddle et al. | 705/59 |
| 2002/0120726 A1 | 8/2002 | Padole et al. | 709/222 |
| 2002/0157089 A1 | 10/2002 | Patel et al. | 717/178 |
| 2003/0002671 A1 | 1/2003 | Inchalik et al. | 380/202 |
| 2003/0046675 A1 | 3/2003 | Cheng et al. | 717/173 |
| 2003/0088516 A1 | 5/2003 | Remer et al. | 705/59 |
| 2003/0185399 A1 | 10/2003 | Ishiguro | 380/281 |
| 2003/0192040 A1 | 10/2003 | Vaughan | 717/173 |
| 2003/0237005 A1* | 12/2003 | Bar-Or et al. | 713/201 |
| 2004/0015886 A1 | 1/2004 | Aaltonen et al. | 717/134 |
| 2004/0117644 A1* | 6/2004 | Colvin | 713/193 |
| 2004/0117663 A1* | 6/2004 | Colvin | 713/202 |
| 2004/0186971 A1* | 9/2004 | Meharchand et al. | 711/163 |
| 2005/0138387 A1* | 6/2005 | Lam et al. | 713/185 |

* cited by examiner

ANTI-PIRACY SOFTWARE PROTECTION SYSTEM AND METHOD

This application claims priority from Application Ser. No. 60/470,062 filed May 12, 2003 pursuant to 35 U.S.C. §119(e).

FIELD OF THE INVENTION

The present invention relates generally to software protection, and more specifically, to an anti-piracy system for protecting distributed software applications from unauthorized use.

BACKGROUND OF THE INVENTION

Software products can be distributed in a variety of different ways. The most common distribution method today is to package the software on optical or magnetic disk or tape media, such as compact disk (CD-ROM), Digital Versatile Disk (DVD) or floppy disk. Software can also be distributed electronically over networks, such as streaming or packetized data sent over local or wide area networks (intranets), the Internet, and even wireless networks, (e.g., radio). Software products, such as application software (e.g., games, programs, and so on) or digital data (e.g., text, photos, video or graphical data, and so on), are often distributed in their entirety as complete standalone products. This means that the software can be accessed and used by anyone who happens to possess it, along with the appropriate computer, game machine, or playback device. This not only poses a problem for owners of the software with regard to theft of their purchased products, but represents a huge problem for software producers in that it facilitates the illegal copying and distribution (pirating) of their software products. In effect, each valid copy of a disk, tape or downloaded program can be used as master to generate scores of illegal copies.

The problem of software piracy has become an enormous challenge and burden to the software industry. It affects most software markets, in particular the entertainment, gaming, and small business application segments of the industry. In the PC (personal computer) game industry alone, according to one estimate, ten installed copies emanate from each single purchased copy. This represents a critical loss of revenue for software producers and publishers. The problem of software piracy is especially critical in the early life-cycle of a product. Through hacking of security mechanisms, illegal copies of a new software product can be made available in the open market days or even weeks in advance of it being officially released for sale by the producer. This type of piracy can cripple the profitability or even viability of a product for a producer before it is even released for distribution.

Although some anti-piracy and copy protection schemes currently exist to protect distributed software, these systems are typically not adequate to protect against a determined attack to break the protection. Moreover, once a program has been hacked, it is usually quite easy for the hacker to produce downloadable tools that eliminate the protection. The time to crack a software application security system is typically measured in hours or, at most, a couple of days. This means that as soon as a pirate gains possession of the software, it is often a simple matter to remove existing digital rights management tools, such as copy protection, and sell or distribute illegal copies of the software.

The static nature of most current widely distributed software products is a particular problem that is not adequately addressed by most present copy protection schemes. Once someone has the disk or the distribution files, it is very easy for competent hackers to redistribute the software in the same or any other available media, given the nature of digital storage and the ability to make nearly perfect reproductions. Furthermore, the pervasiveness of hacking has led to widespread availability of downloadable tools and instructions that enable even casual users of the product to remove many of the copy protection mechanisms in use today.

In addition, existing software applications are generally distributed as homogenized releases. This makes it difficult to identify, track, or tie the product to the authorized end-user. Although software registration is available, such as by using registration codes, network addresses (e.g., MAC-address from a network card), CID (Computer ID) mechanisms, and so on, these systems only tie the software to the hardware. These solutions thus have the disadvantage for the end-user that the software effectively only works on the computer it was first installed on. Such solutions can also lead to other problems such as lost registration codes or original disks with the unique serial numbers, and so on.

What is needed, therefore, is software protection that provides robust anti-piracy techniques that make hacking a software product impractical and cost-ineffective.

What is further needed is a software protection scheme that is unique to each authorized end-user and installation, rather than the target device.

SUMMARY OF THE INVENTION

A software protection system for widely distributed, licensed software products is described. In one embodiment of the present invention, a distributed client-server computer network connects a customer end-user with the producer (publisher) of the software. The protection program is integrated with the software product and is applied directly on the source code or on the execution level of the distributed software. The platform acts as a launcher of the distributed application, as well as a new media channel. This new channel is customizable to fit the publishers' needs, and can be used to establish continuing two-way communication between the user and the producer and allows the producer to display news message, send upgrades, and allow automatic downloads of patches, extra content, and so on.

The software product is distributed as an incomplete executable. A security module provided by the producer and unique to the user and installation is transmitted to the user upon registration, and comprises the missing executable portion of the software product. When the user installs the target application (e.g., a game or similar software product), user registration is required. User registration involves the establishment of a username and password, along with the creation of a unique profile for each user. Once the user profile has been established, the user can register the target application by entering the registration code that comes with the distribution. The product is activated through the appropriate after the entered code has been verified. Registration of the product causes the system to transmit a security module to the client computer. The security module comprises the missing executable portion of software that integrates with the initially distributed software to produce a fully functional application program.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

Figure 1:
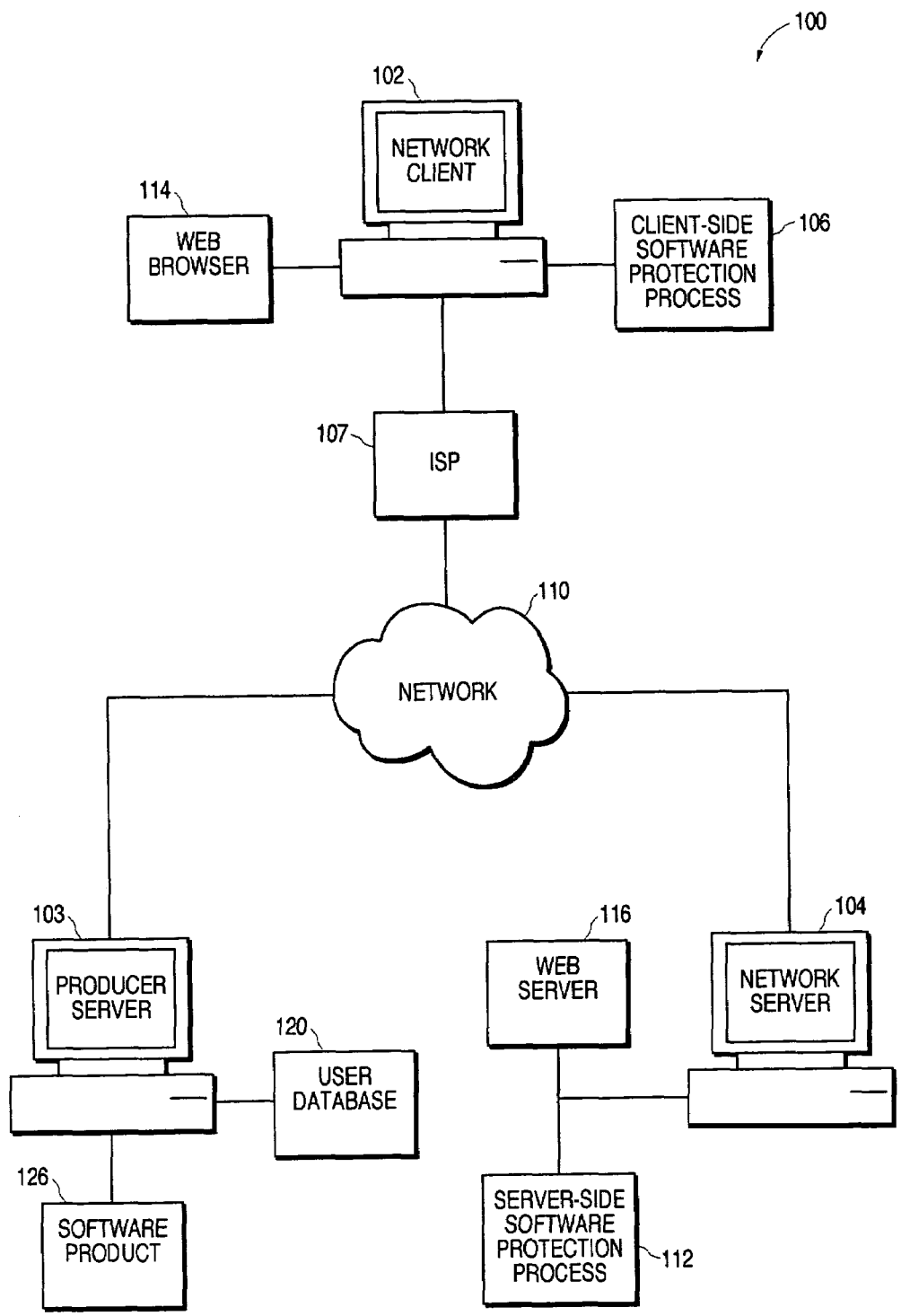
FIG. 1 illustrates a network for implementing a software protection and software product distribution system, according to one embodiment of the present invention.

A software protection system for preventing the unauthorized copying and use of widely distributed software products is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network, or a physical or wireless telecommunications network. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers. In some instances, the client and server functionality may be implemented on a single computer platform.

Aspects of the present invention can be used in a distributed electronic commerce application that includes a client/server network system that links one or more server computers to one or more client computers, as well as server computers to other server computers and client computers to other client computers. The client and server computers may be implemented as desktop personal computers, workstation computers, mobile computers, portable computing devices, personal digital assistant (PDA) devices, game playing devices, digital audio or video playback devices, or any other similar type of computing or electronic playback device.

FIG. 1 illustrates an exemplary network system that includes distributed client/server computers for the distribution and use of various different software products. The system also includes a client/server software protection system to protect the distribution and use of the software programs. In the network embodiment illustrated in system 100 of FIG. 1, a software producer (also referred to as a publisher) makes software products 126 available for distribution through producer server 103. Such products can be made available for use on one or more client computers, such as client computer 102. The software product 126 can be any type of executable software program, such as a game or application program, or electronic data used on the client computer 102. The software product 126 can be distributed in a variety of different media, such as CD-ROM, floppy disk, tape, and so on. Alternatively, it can be transmitted electronically to the client 102 over network 110. Thus the executable programs or modules that comprise the software product 126 can be any form of distribution, such as CD, DVD, streaming download, e-mail, and so on.

In order to protect the distribution and use of the software product in system 100, the process includes server-side and client-side components that provide protection mechanisms within the software products, and restrict user access to the protected software products. These mechanisms include user registration information that is stored in a user database 120 maintained and coupled to producer server 103.

For a network embodiment in which the client and server computers communicate over the World Wide Web portion of the Internet, the client computer 102 typically accesses the network through an Internet Service Provider (ISP) 107 and executes a web browser program 114 to display web content through web pages. In one embodiment, the web browser program is implemented using Microsoft® Internet Explorer™ browser software, but other similar web browsers may also be used. Network 110 couples the client computer 102 to server computer 104 and producer server 103, either or both of which execute a web server process (e.g., web server 116) that serves web content in the form of web pages to the client computer 102.

In one embodiment of the present invention, the network server 104 and server-side software protection process 112 represent a platform that connects the end-user client computer 102 with the producer (publisher) of the software using a computer network 110, typically the Internet. In general, the software protection mechanisms are integrated with the software product, and are applied directly on the source code or on the execution level of the software product. The platform acts as a launcher of the application, and also as an alternative media channel, that is customizable to fit the publishers' need with regard to distribution content and post-installation support.

The software protection system illustrated in FIG. 1 contains a set of software components that, when integrated with the software product to be protected, establishes that only the registered owner/proprietor of the protected software is able to access and use the software. The software protection system includes three main components. These include a server side protection process 112 that generates unique security modules that are embedded within the software product. The security module is an encrypted and obfuscated program consisting of code, filled with random data but containing one, or several encrypted programmatic instructions that essentially become hidden from unauthorized access or reverse-engineering.

The second component is a client-side process 106 that effectively wraps the target application (software product), taking over as the main executable and communicating in an encrypted fashion with the producer server 103. The client-side process 106 enforces digital rights management on the client computer 102 and reads proprietary digital certificates in order to decode and execute code scrambled and hidden through server-side process 112.

The third main component is the security module, which is a digital collection of arbitrary functions and dynamic link library (DLL) pointers that are encrypted in a unique fashion through the server process 112. In one embodiment, the entire collection is encrypted, then a second function is further encrypted one or more times. Decoding is possible only through the use of a digital certificate containing pointer information regarding where the functionality lies within the module, as well as a key necessary to decode the particular segment in order to load it into memory and execute the function. In addition to this security, the function is encoded and hidden within the module and utilizes a secret handshake based on certain parameters, that are unique per module (and thus per user account). Each security module is generated by server process 112 and is unique to a certain user profile. The security module can reside as an ordinary file on the client computer 102, but can only be accessed and executed by the client-side application 106.

In one embodiment of the present invention, the security module includes functions and pointers to functions within the executables of the software product (protected application). The functions are machine level code portions. The pointers point to functions both inside the security module itself and to functions inside the protected application. If one of the pointers is faulty the application will crash. This allows the pointers to be used as security keys for the application. During distribution to the client computer 102, not all of the function pointers are delivered together with the security module. For example, in exchange for "scratch positions" the so-called "execution codes" are returned from the server. These "execution codes" are in fact function pointers. The advantage of sending function pointers from the server to the client as certificates is that it is very difficult for a hacker to circumvent the verification of the pointers. Since the application does not know how to proceed during execution without them, a hacker will not be able to determine this either. The difference between pointers to functions in the application code and pointers to functions in the security module is that the pointers to functions in the security module are different for each user, since the security module is different for each user.

User Registration and Installation

When the user installs the target application (e.g. a game or business application) on the client computer 102, user registration is required. Registration is performed over the network 110. The registration process requires the establishment of a user name and password, and the creation of a unique profile for each user. This user profile is stored in a database accessible to the producer, such as in user database 120. Note that user database may be closely coupled to the producer server 120, or it may be stored on in a memory storage remotely coupled through network 110. Once the user profile has been established, the user registers the target application by entering the registration code that comes with the distribution. The registration code can be distributed electronically or telephonically to the user or through a physical printed certificate distributed with the software media. The product is activated after the entered code has been verified on the producer server 103. For this embodiment, the producer server maintains a database that stores relevant product ID and registration code correlated for each software product. In general, each unique distribution will carry a unique registration code.

When the user launches the application, a username/password dialogue box is displayed on the client computer 102. The user logs on by entering the appropriate information. Access to the program may then be granted, or, depending upon the producer's implementation, a portal may be displayed, enabling the user to select and access any of a selection of products available from the publisher database or website. In this manner, a producer can provide an on-line catalogue of products to allow the user to search and select particular products for download or distribution by CD, DVD, and so on.

Figure 2A:
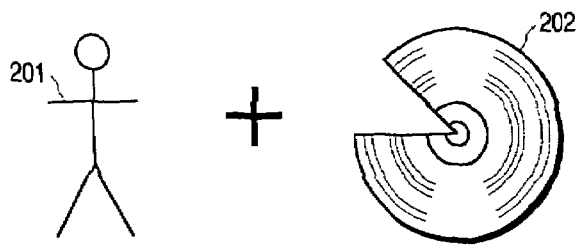
FIGS. 2A, 2B, and 2C illustrate the general steps by the software protection system during the registration and distribution of the software product, according to one embodiment of the present invention.
Figure 2B:
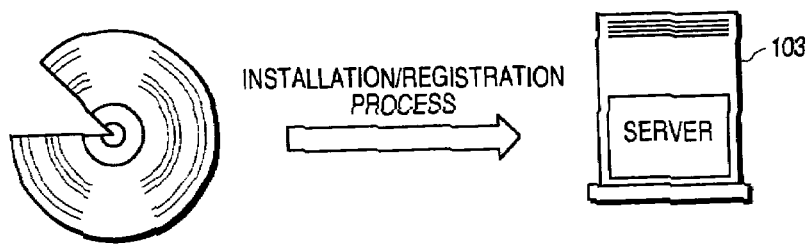
Figure 2C:
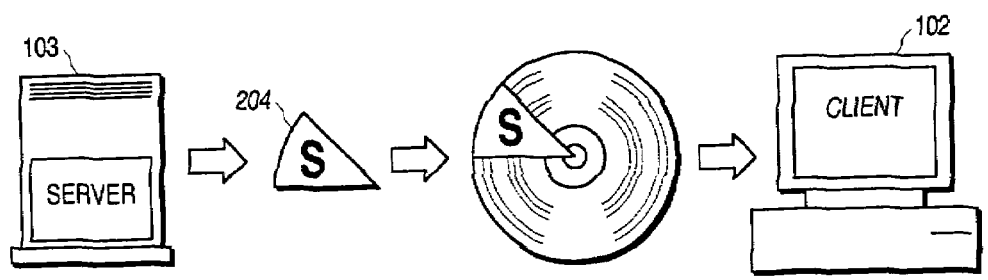

FIGS. 2A, 2B, and 2C illustrate the general steps that are performed during the registration and distribution for the software protection system, according to one embodiment of the present invention. In FIG. 2A, a user 201 has purchased a software product that is distributed on a physical media, such as a compact disk 202, which is an authorised distribution copy of the software product 126 of FIG. 1. Although a CD is illustrated, the distribution media can be any type of physical media or downloadable program module. As is depicted in FIG. 2A, the application the user has purchased is not complete and will not work as is. In order to obtain the "missing piece" of the program, the user must properly register and install the product. Thus, as illustrated in FIG. 2A, the software product that initially reaches the customer is an incomplete distribution, which is missing a portion of the executable code. The software protection processes illustrated in FIG. 1 involve the distribution and installation of this missing portion to produce a full executable program for the user 201.

FIG. 2B illustrates the installation process. In this step, the client application 106 will initiate registration with the producer server 103. Once a connection with the producer server 103 is established, the purchased product 202 should be registered. For registration, the user 201 must enter the registration code (also referred to as a "product key") delivered with the application 202. The installation step illustrated in FIG.

2B results in an entirely unique installation, such that the installed software is different for each user, regardless of the type of product being used.

In one embodiment, the product key (registration code) is a random, non-formulaic data string, which is originally generated using an algorithm. The key that is entered by the user is compared to an actual stored key maintained by the producer server. It is not a key that is algorithmically checked. In this manner, security is enhanced since it is not possible to make a generator to generate an unlimited number of keys to try to crack the registration code. Moreover, since the comparison is made on the producer server, instead of on the user client computer via an algorithm, it is virtually impossible for a hacker to discover the algorithm. As soon as a key has been used, it is removed from the working activation-keys in the database, so no one can use the same registration code twice.

Once the producer server 103 acknowledges that the particular product key exists in the appropriate database and is valid, it will construct and download to the client computer 102 a security module 204 that integrates with the application software 202 and permits the application to be run on the client. This is illustrated in FIG. 2C. In effect, the security module 204 represents the missing piece of the originally distributed application program 202. Each security module is a unique module of generated code using one-time-pad encryption. It is downloaded and installed as a key-lock between the launcher and the target application 202. Because the security module is always unique, there is no default module, and no way of redistributing a common or generic module that works with other security systems. The security module is tied to a specific user and controlled over the network, thus, there can only be one such installation running at any given time. This makes it nearly impossible to distribute a static "freeze image" of an application. Because the security module is not generated by a formula, brute force decryption techniques are ineffective. This mechanism also prevents debuggers from being run on the application. Furthermore, because no distribution acts the same or works the same, it is virtually impossible to develop tools to remove the set of protections, perform disassembly and reverse engineering on the product The use of security modules that are unique and tied to a user profile and an electronic license in the form of a certificate, makes the particular software distribution identifiable to the producer. Any unauthorized user wishing to pirate the software would need to access the server in order to gain knowledge about the encryption, certificates, and so on. Since this information is only pseudo-information that is randomized and stored on the producer server 103, it is nearly impossible to replicate the software in a fashion that a user without a valid license can effectively use it.

For site license applications, such as when a family or group of users have licenses to use one instance of the application protected by the invention, each member will use the registration key in order to unlock the application for their own unique profile, stored on the server. All license rules and validation of the licenses is done on the producer server, where frameworks and rule-sets can be added to tell the application not to start, remove itself from the system, issue a visual warning, or any other means necessary to enforce digital rights management.

Upon installation of the protected application, the security module is not available and must be fetched from the producer server through applicable means. When the server gets a request to release and make available a new certificate/security module, the producer server can enforce digital rights management. For example, the server can refuse to accept an additional installation of the software, or accept the request and generate a new security module and certificate, thus invalidating the old certificate/security module. It is also possible to enforce rules such as issuing a temporary certificate/security module that will only last for a given amount of time/given number of uses. Thus, a producer can set an expiration date so that when a security module expires, a new module must be downloaded from the publisher's server. At this time, the producer can check that the installation is permitted, and if the same media has been used to install the application on another computer, the producer server may return the message that this installation has been deactivated.

If the application is copied as a whole, with all available parameters and by replicating all the local information, including an already downloaded certificate and security module as well as manipulating registry entries and other unique identifiers from hardware to hardware, it is possible to use the application and thereby circumvent the security. However, in one embodiment, the integrity of the installation is checked by the distributor server at periodic time intervals. Thus, the installed application is programmed to periodically ask for a new certificate and security module for each user. This request is answered by the server, so that over time there will only be one valid distribution. In general, whether or not this "valid" application is in the hands of the legitimate user or not is unknowable if the user has distributed his own personal information in this way; but since at some point the legitimate user purchased the software it is likely that the legitimate user will enforce his own interests if he/she has bought the protected application in good faith and stop distributing copies that will be invalidated shortly in any event.

In one embodiment, the security module 204 is implemented as a proprietary encrypted digital certificate in the form of XML that is used to keep information necessary to run the "unlock" sequence. This allows a user to be offline for short or extended periods of time before having to renew the security module and the certificate. By uniquely identifying each user, and each instance of the software running through the security module it is possible to utilize digital rights management of various kinds depending on the final product implementation.

The client-side process 106 contains the processing logic necessary to identify the security module, the digital certificate, and through encrypted proprietary XML protocol, communications with the producer server 103 to determine whether or not the protected application has been tampered with. As each security module is unique to the user, it is virtually impossible to recreate the logic needed to execute the protected application without having access to the security module itself. Even if an unauthorized user were able to replace the logic necessary for their own installation, they would not be able to produce downloadable tools that effectively render existing copy protection or digital rights management tools ineffective. By giving out the username/password, copying the digital certificate, and replacing the security module on a second client computer, it may be possible to utilize the application in an unlicensed manner, but in general only for a very brief amount of time, as upon the next periodic renewal of the security module and the digital certificate the copied/old security module and certificate will no longer be valid.

An additional and substantial benefit of the application is that it no longer becomes possible to distribute pirated copies of digital merchandise before it is available through retailers, as the security module generation is necessary to run the application it can be made unavailable until the retailer or user of this application decides that it should be available publicly.

Producer/Publisher Interface

Figure 3:
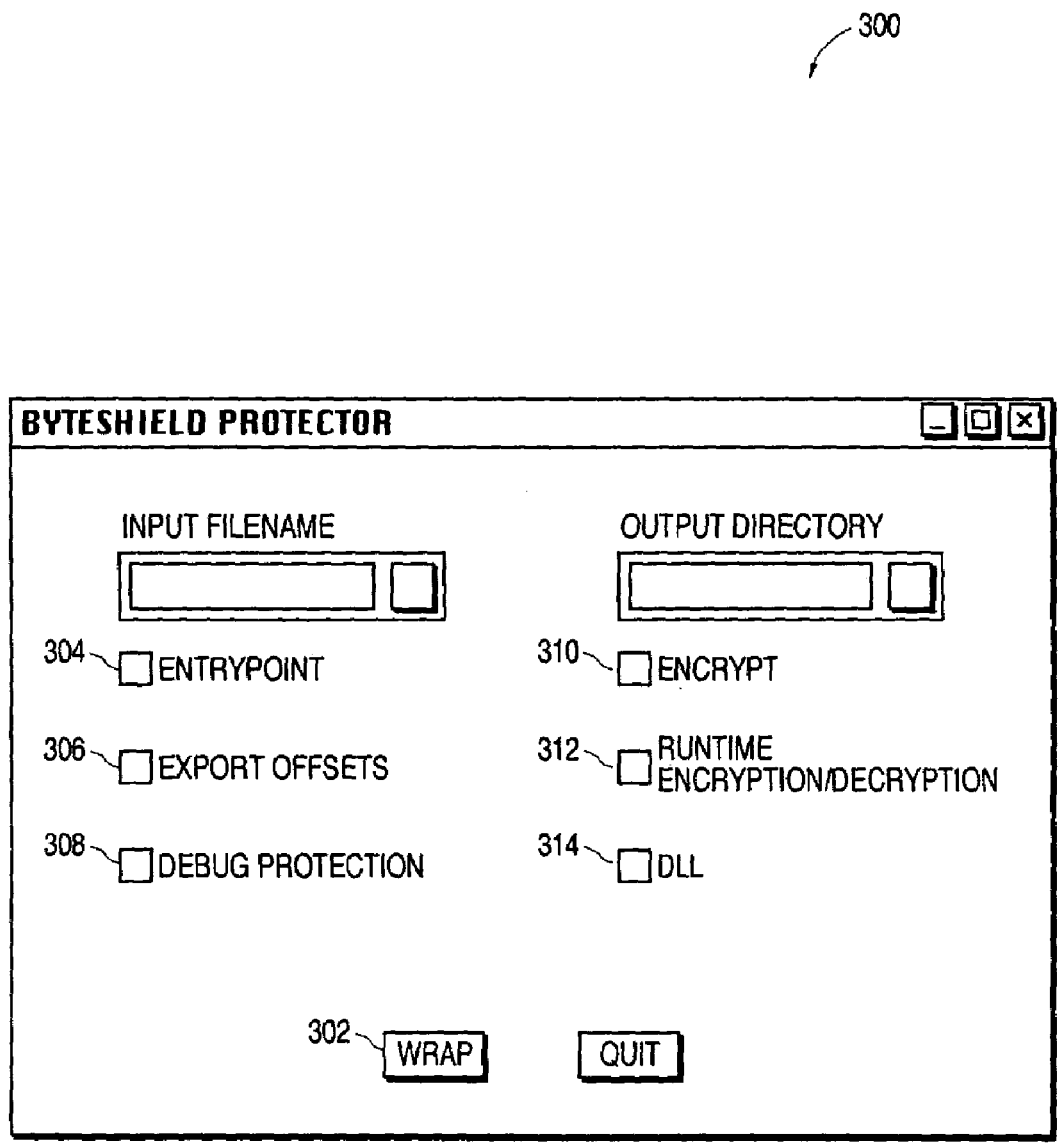
FIG. 3 illustrates a screen display for integrating software protection mechanisms with an application program, according to one embodiment of the present invention.

As illustrated in FIG. 1, the software product 126 to be protected is typically available from a database or storage maintained by the producer and controlled by the producer server 103. The server-side process 112 provides executable and graphical user interface modules that allows the producer to implement the security mechanisms on their products. FIG. 3 illustrates a screen display for integrating software protection mechanisms with an application program, according to one embodiment of the present invention. Various different mechanisms are provided that the producer can use to protect the distributed software product. The graphical front-end 300 illustrated in FIG. 3 allows the producer to select the components of the piracy protection suite to be integrated with the distributed products.

Through the user interface 300, the producer can select the filename of the product or executable to protect, decide which parts of the protection to employ, and specify an output directory for the protected file. The wrap button 302 executes the software protection embedding process, which includes a number of different protection schemes illustrated in the main display area of screen display 300.

The entry point mechanism 304 inserts a faulty entrypoint into the software file. When the client 102 launches the executable, it launches it at the correct entrypoint. If the client does not find the entrypoint, it requests it from the producer server 103. This mechanism ensures that anyone who tries to write a custom loader for even a fully unprotected executable file will fail, unless they manage to find the true entrypoint and insert it. In one embodiment, the correct entry point is sent to the client computer 102 from the producer server 103 in an encoded fashion. The application program is launched, but the process is paused before the actual execution, right after the operating system loads the executable program. The correct entry point is then set in the operating system structures, and the process is resumed.

The export offset protection mechanism 306 is a powerful protective mechanism that strips the executable of all the near calls. Program calls will instead be made through the protection mechanism. Anyone trying to dump the running executable from memory will end up with a non-working copy, since the function calls will not exist.

The debug protection mechanism 308 enables an anti-debugging scheme to be implemented. This mechanism makes it impossible to use a debugger to break into the executable, so a potential attacker will have no way of stepping through the running process. The encrypt mechanism 310 encrypts the executable file, decrypting it on loadtime. Thus, it will not be possible to disassemble the executable to see how it works.

The Runtime Encryption/Decryption mechanism 312 encrypts small portions of the executable file. These portions will remain encrypted when the file is loaded. Once the program reaches an encrypted part, it will be decrypted, executed, and then encrypted again. Anyone trying to dump the running executable from memory will thus end up with a non-working copy, since there will be encrypted parts that will not decrypt without the corresponding decryption mechanisms.

The sixth protection method is the DLL mechanism 314, which bakes the executable into a dynamic link library (DLL), enabling it to be executed with a LoadLibrary( ) command. The DLL provides one or more particular functions. The program accesses the functions by creating either a static or dynamic link to the DLL. This inserts a small layer of obfuscation, which is typically effective against casual attackers.

Upon completion, the wrapping process creates a definition-file (e.g., DEF file) for the protected software product. This file will be used in the product registration-step using administration tools available on the producer server 103.

Client User Interface

Once the software product is protected and stored appropriately on the producer server 103 or other server, it is ready to be distributed and accessed using the client side process 106. In general, the client process 106 uniquely identifies the user by asking for credentials, username and password, and sends encrypted information along with information regarding the protected software, such as version number, a unique serial number, and possibly registration code to the producer server 103. This information is checked for validity, and if authorization is successful, a digital certificate is downloaded to the client. In addition to the digital certificate, a dynamic link library, which is encrypted by a unique key created at the time of user registration is downloaded to the computer where the registration was made. This encrypted dynamic link file contains random invalid computer instructions when decrypted and is not executable. Within this dynamic link library exists an encrypted function that is hidden within a set of parameters only known to the producer server and only available through the encrypted digital certificate locally. This hidden function has a built-in handshake process that only allows a counterpart process to access it, and starts or gets access to data within the protected software.

Figure 4A:
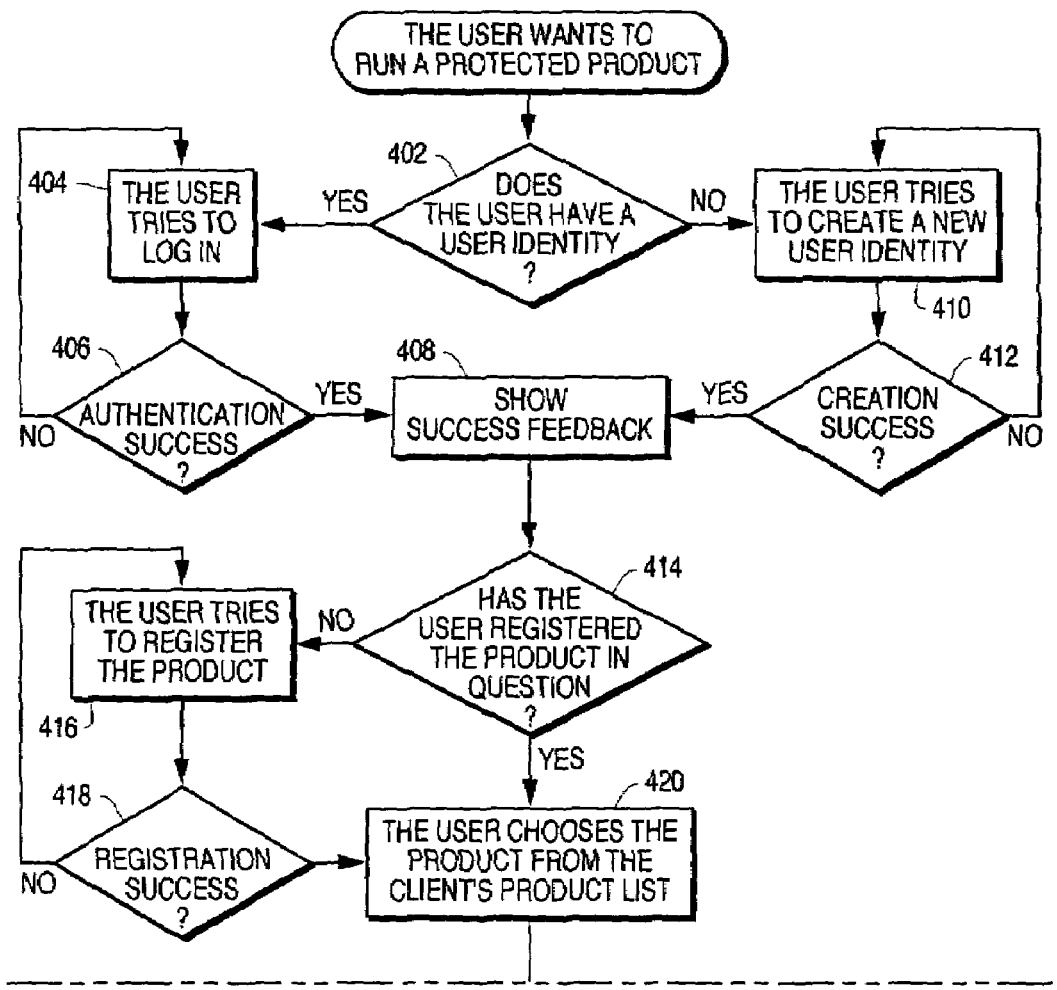
FIG. 4 is a flowchart that illustrates the user performed steps for selecting and registering a software product, according to a method of the present invention.
Figure 4B:
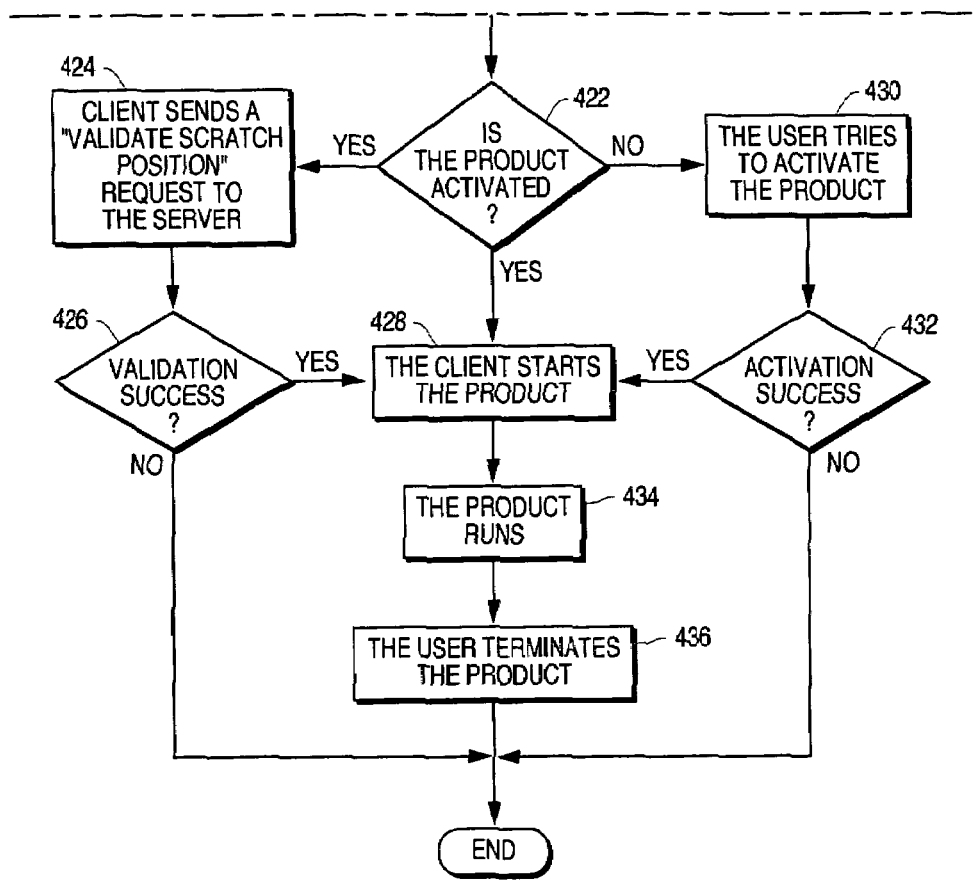

As described above, the user must complete certain discrete steps before he or she can use the software product. FIG. 4 is a flowchart that illustrates the user performed steps, according to a method of the present invention. After acquiring a product to be used, the user starts the client computer 102. Initially, the client process 106 will give the user a choice of either logging in or creating a user identity. In step 402 it is determined whether the user has a user identity. If so, the user can log in to the system, step 404. If the authentication of the user identity succeeds, step 406, the user will see a list of all his/her registered products, step 408.

Figure 5:
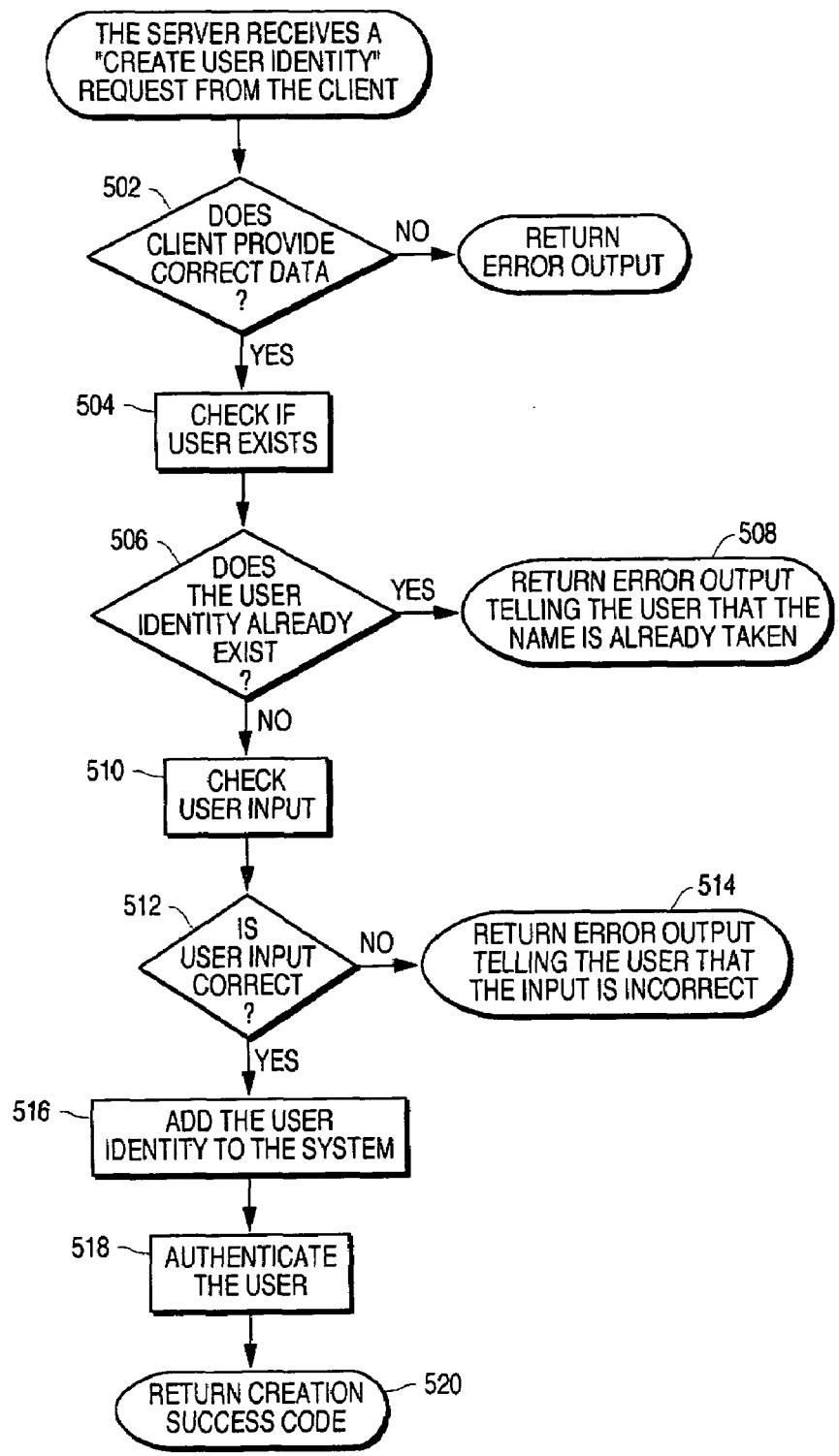
FIG. 5 is a flowchart that illustrates the steps of creating a user identity, according to a method of the present invention.

If the user does not have a user identity, one will need to be created, step 410. The flowchart 500 of FIG. 5 illustrates the steps of creating a user identity, according to a method of the present invention. If the creation of the user identity succeeds, step 412, the client will show an empty product list since the user has no registered products yet.

Figure 6:
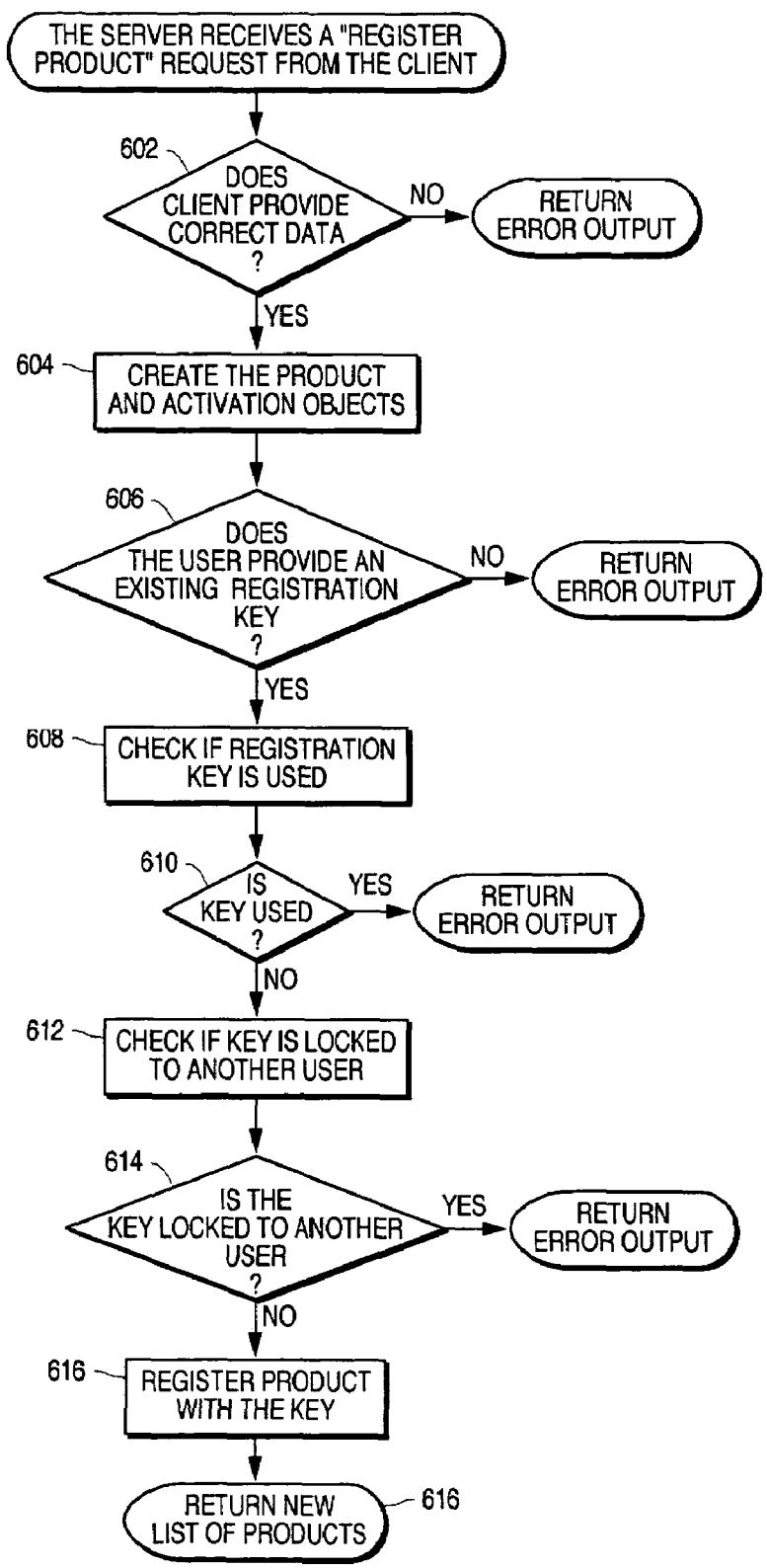
FIG. 6 is a flowchart that illustrates the steps of registering a product, according to a method of the present invention.

If the user has registered the product to be executed, step 414, the product is selected from the client's product list, step 420. If the product is not registered the user must register the product, step 416. The flowchart 600 of FIG. 6 illustrates the steps of registering a product, according to a method of the present invention. If the registration succeeds, step 418, the product will be visible in the client's product list and can be chosen by the user, step 420.

Figure 7A:
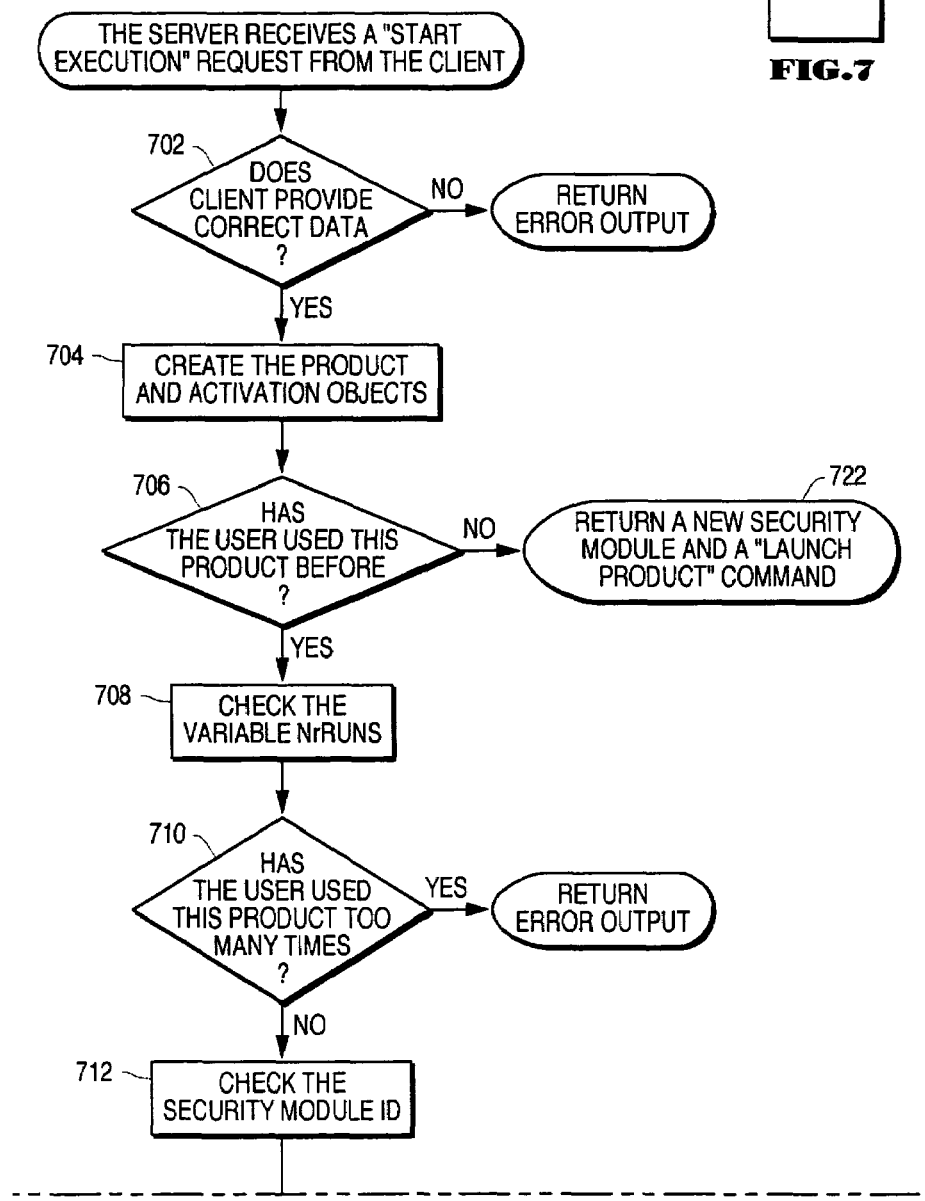
FIG. 7 is a flowchart that illustrates the steps of activating a product, according to a method of the present invention.
Figure 7B:
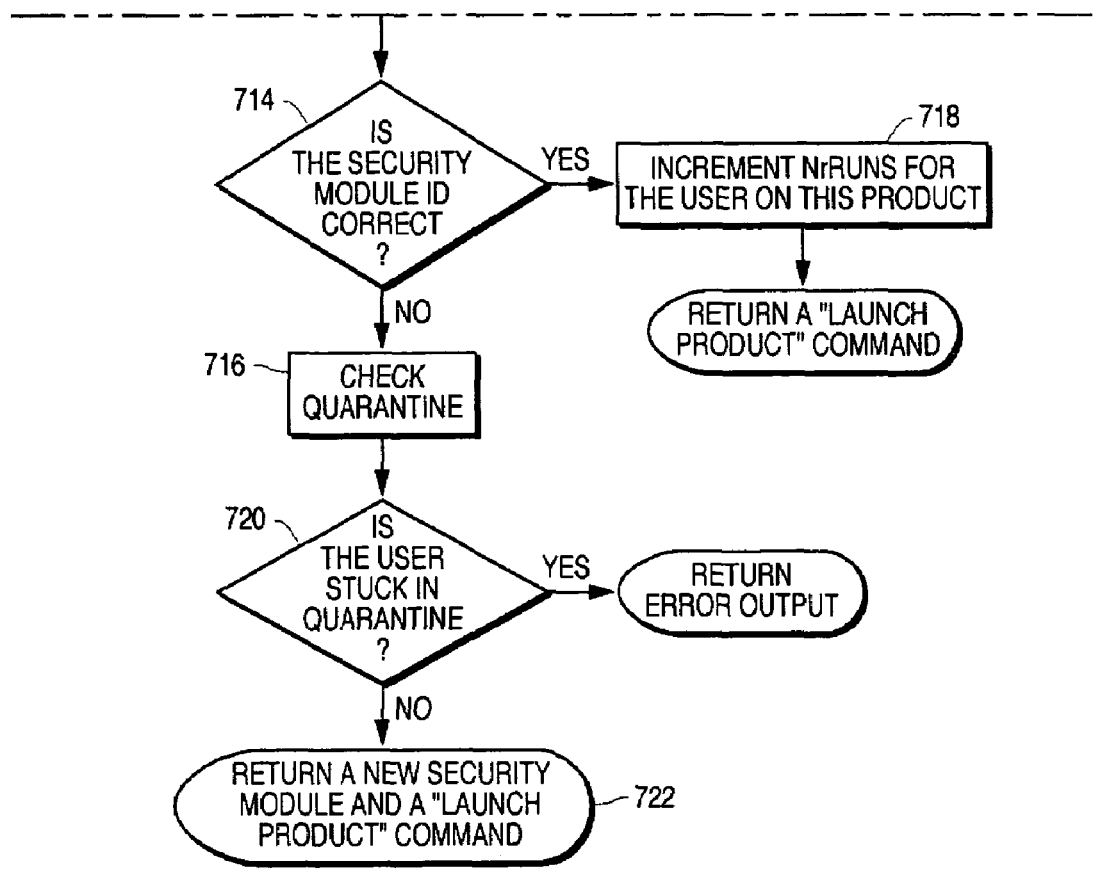
Figure 8:
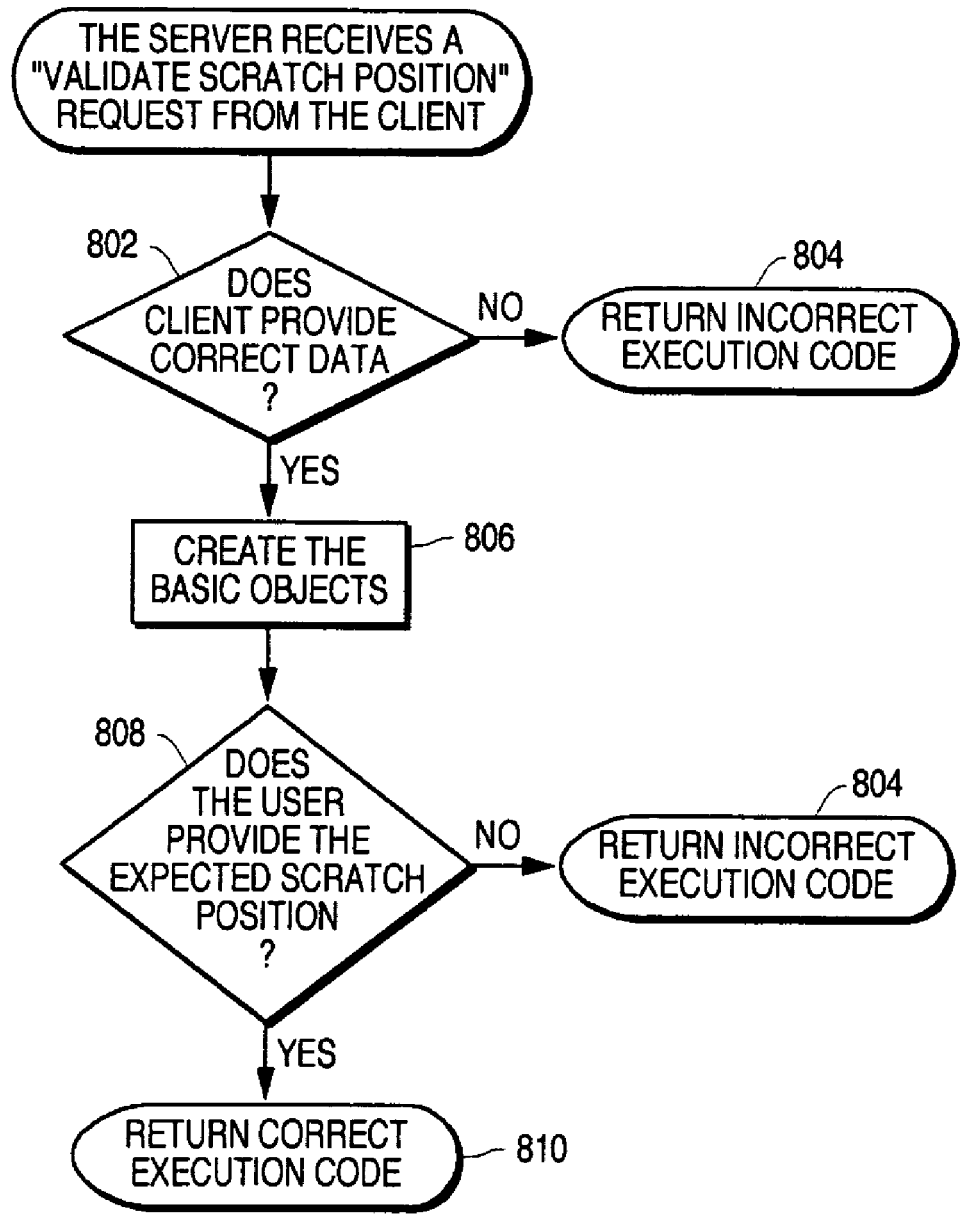
FIG. 8 is a flowchart that illustrates the steps of validating a scratch position, according to a method of the present invention.

When the product is chosen and is not yet activated the client process 106 will send an "activate product" request to the producer server 103, step 430. The flowchart 700 of FIG. 7 illustrates the steps of activating a product, according to a method of the present invention. If the activation process succeeds as determined in step 432, the client process will start the product, step 428. If the product is already activated the client process will send a "validate scratch position" request to the producer server 103, step 424. The flowchart 800 of FIG. 8 illustrates the steps of validating a scratch position, according to a method of the present invention. If the validation is successful, as determined is step 426, the product will be started by the client computer 102, step 428. After the product is started it will run normally, step 434, until the user terminates it, step 436.

As illustrated in step 410 of FIG. 4, a new user must first create a user identity on the producer server 103. FIG. 5 illustrates the steps in detail for this process. When the user has a defined identity on the server all future access to the protected application will be tied to this identity. The user fills in an online form and transmits this form to the producer server 103. The online form provides input boxes for the user to input name and other identifying information such as address, personal ID number, passwords, and so on.

In step 502, the process performs the basic authentication, validation and decryption, in which the client data is validated as to correct data type. Next the server checks if the identity name suggested by the user is already used by some other user, steps 504 and 506. If the user name is already taken, an error message is returned to the user, step 508. If the name is free, the rest of the user's input is inspected, step 512. If any errors are found in this step, an error message is returned, step 514. If the user input is correct, the user identity is saved to the system, step 516. The user is then authenticated, step 518, and a code representing success is returned to the client, step 520. For a new user, the overall software access and execution step then proceeds from step 408 in FIG. 4.

As illustrated in step 414 of FIG. 4, a user must register the software product to be used. FIG. 6 illustrates the steps in detail for this process. When a user wants to register a product, the client 102 sends a request including a DAC (Digital Access (Registration) Code) to the producer server 103. As illustrated in FIG. 6, the server receives the request and processes it. In step 602, the basic authentication, validation and decryption steps are performed. If the validation succeeds, basic product and activation data objects are created, step 604. Next the producer server checks if the DAC exists for this product, step 606. If the DAC does not exist for this product an error message is returned to the user. If the DAC exists, the process checks if the DAC already has been used by another user, steps 608 and 610. If so an error message is returned to the user explaining that the DAC has been used by another user. If the DAC has not been used, the process checks to see if the DAC is locked to a specific user, step 612. A locked DAC can only be used by the user to whom it is locked. If the DAC is not locked the server proceed to the actual registration process, step 616, where the user's registration of the product is saved to the system. An updated list of all of the user's registered products, including the just registered product, is then returned to the user, step 618.

As illustrated in step 422 of FIG. 4, a registered software product must be activated prior to use. FIG. 7 illustrates the steps in detail for this process. A user starts a protected application by choosing a product from the list displayed on the client 102. The client then establishes an encrypted communication link with the producer server 103 and sends a "start execution" request to the server.

One important parameter sent in the request is the security module ID. If the user has never run the product before on the machine he or she is currently using, the client will send a null value back. If the user has not used the product before on this machine the client will send the ID of the latest security module downloaded to the machine. The security module ID is an encrypted code unique for the security module. This process also includes a quarantine feature, which allows a user to run a product from one computer at a time by allowing the user to move the activation from one computer to another. If a user installs a product on one computer but later needs to use the product on another computer, the producer server will allow the move if a certain time has passed since the last time the user moved the activation. This period of time is referred to as the product's "quarantine" period.

As illustrated in flowchart 700, basic authentication, validation and decryption is performed in step 702. If the validation succeeds basic product and activation data objects are created, step 704. Next the server checks if the security module ID parameter is zero, indicating that there is no security module on the computer for this product, step 706. If so the user has no security module on the machine and a new security module is returned to the client, step 722.

If the security module ID provided is non-zero, the server compares the maximum allowed runs for the product in question with a variable (NrRuns), which represents how many times the user has run the product, step 710. If the user has reached maximum runs he is blocked for further usage of the product. If the user has not reached maximum runs the server compares the security module ID sent with the security module ID the system has saved for this user, step 712. If the sent security module ID matches that of the system, as determined in step 714, all is well and the variable NrRuns is incremented, step 718. After this a "launch product" command is returned to the client telling the client it is safe to start the product.

If the security module ID sent by the client does not match the ID saved by the system, the server asks the user if he wants to move the activation to the current machine. This is only allowed if the user is not stuck in quarantine, as determined in steps 716 and 720. If the user chooses to move the activation, a new security module is downloaded to the client with a "launch product" command, step 722.

As illustrated in step 424 of FIG. 4, the security module contains a set of codes called "scratch positions" unique to the user's security module. The scratch position will be exchanged by the producer server for an "execution code", which is a code needed by the protected application to continue execution. When the client or security module wants to validate a scratch position it sends a "validate scratch position" request to the server. These requests are sent when the application starts and sometimes during runtime. When the producer server receives such a request it will perform the steps illustrated in the flowchart illustrated in FIG. 8.

In step 802, the process performs basic authentication, validation and decryption steps. If validation fails, an incorrect execution code is returned to the client, and this will effectively halt the execution of the application, step 804. If validation succeeds basic data objects for the scratch position are created, step 806.

In step 808, the scratch position value is compared to the value expected by the server. The server will only accept a scratch position from a user's security module once, and the scratch positions must arrive to the server in a specific order. If the server receives an incorrect scratch position, it will return an incorrect execution code, step 804. If the scratch position value equals the expected value a correct execution code is returned, step 810.

In one embodiment, the process for registering and allowing the user to access and execute the software product is performed over web-based Internet network. For this embodiment, the basic steps are as follows: the user first installs the software product on the client computer 102. A web-application is then launched allowing the user to activate the software. In order to accomplish this, the application needs the username, password, registration key (provided with the software distribution, or through e-mail, phone, or alternate method). If the registration key has been used before, the application may reject or accept a new registration, depending on what rule set is activated for that particular product. If user registration is accepted, a new and unique security module is created on the server and stored in a database. A new unique product ID is created that uniquely identifies the software product based on the parameters supplied during registration. Pointers to the secret function are also created in the database. A user profile is created in the database in which the user is assigned a unique identification number. The additional steps of product registration, validation, and so on, then proceed as described above with reference to FIGS. 4 through 8. For this embodiment, communication among the client 102, producer server 103 and network server 104 is implemented over the World-Wide Web, with web browser based interfaces among the computers.

The software protection system described herein has been described primarily in relation to use with software application programs, however it should be noted that embodiments of the present invention can also be applied to any type of distributed digital content. In addition, the software protection scheme can be extended to other uses related to the distribution, tracking and maintenance of distributed electronic data. For example, besides copy protection, another benefit to the publisher is the ability to control the release-date of the target application to the hour, without any risk of illegal copies appearing on the Internet. Basically, if the target application is to be officially released by a specific date and time, the publisher has the ability to activate our product on the servers at that given date and time. Because the software security system 100 must download vital pieces of the application, the target application is incomplete (and thus can not be cracked or illegally distributed) until the publisher decides to enable registration and downloading of security modules. This prevents the distribution of illegal copies prior to authorised release and circulation. It also prevents retailers from breaking their agreements and releasing copies pre-launch.

The standardized client/server interaction also lets the publisher control the number of active instances per user. The publisher can implement a widespread variety of licensing options, which are all customizable by the publisher and even interchangeable between applications by simply changing the ruleset on the server. One product can be allowed to run on several computers, or only one at a time. In addition, other types of downloadable content, such as information, advertisements and publisher news, as well as patch functionality, diagnostic tools, and up-sale opportunities can all be delivered through this direct connection with the user. The software security platform thus comprises a two-way communication channel between the user and the producer server, as updates and diagnostics can be regularly sent to the user from the producer and feedback can be sent from the user to the producer. The ability of the producer server to control the installation and distribution and use of the installed software product allows the producer to closely monitor the licensed use of the product. If unauthorised use or copying is detected, the producer can deactivate a single installation or user.

In the foregoing, a system has been described for a software protection mechanism to protect the distribution and use of distributed software products. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computer-implemented method for protecting distributed software containing an executable program over a client server network, the method comprising:
    providing to a user a copy of the distributed software, the distributed software comprising an incomplete executable program requiring a unique security module that includes at least a portion of a program instruction to be installed prior to execution on the client computer;
    transmitting to the user a registration code for use with the distributed software;
    requesting user registration from the user upon attempted execution of the distributed software;
    receiving registration information including the registration code from the user;
    validating the registration code received from the user;
    constructing the unique security module upon validation of the registration code;
    transmitting the unique security module to the client computer; and
    accessing the portion of the program instruction of the unique security module with the distributed software to allow execution of the executable program.

2. The method of claim 1 wherein the distributed software comprises one or more executable programs embodied on disk media.

3. The method of claim 1 wherein the distributed software comprises one or more executable programs embodied in downloadable digital format.

4. The method of claim 1 wherein the user registration comprises a user name and password, and the method further comprises the step of defining a unique user profile for the user.

5. The method of claim 1 wherein the registration code is transmitted to the user through a method including mail, e-mail, fax, phone, or paper certificate accompanying the distributed software media.

6. The method of claim 5 wherein the registration code is a non-formulaic data string that is compared with a counterpart registration code stored on a server computer coupled to the client computer.

7. The method of claim 6 wherein the unique security module comprises a unique data string, and further comprising the step of encrypting the security module data string prior to installation and transmission to the client computer.

8. The method of claim 7 wherein the unique security module comprises a digital collection of arbitrary functions and dynamic link library pointers.

9. The method of claim 8 further comprising the step of verifying the unique security module and distributed software on a periodic time basis defined by the server computer.

10. A client-server computer system for protecting distributed software containing an executable program distributed from a server computer to a client computer over the network, the system comprising:
    means for providing to a user a copy of the distributed software, the distributed software comprising an incomplete executable program requiring a unique security module that includes at least a portion of a program instruction to be installed prior to execution on the client computer, wherein the incomplete executable program is stored on a computer-readable medium accessible to the client computer;
    means for transmitting to the user a registration code for use with the distributed software;
    means for requesting user registration from the user upon attempted execution of the distributed software;

means for receiving registration information including the registration code from the user;

means for validating the registration code received from the user;

means for constructing the unique security module upon validation of the registration code;

means for transmitting the unique security module to the client computer; and means for accessing the portion of the program instruction of the unique security module with the distributed software to allow execution of the executable program.

11. The system of claim 10 wherein the distributed software comprises one or more executable programs embodied on disk media.

12. The system of claim 10 wherein the distributed software comprises one or more executable programs embodied in downloadable media.

13. The system of claim 10 wherein the user registration comprises a user name and password, and the method further comprises the step of defining a unique user profile for the user.

14. The system of claim 10 wherein the registration code is transmitted to the user through a method including mail, e-mail, fax, phone, or paper certificate accompanying the distributed software media.

15. The system of claim 14 wherein the registration code is a non-formulaic data string.

16. The system of claim 10 wherein the unique security module comprises a unique data string, and further comprising the step of encrypting the data string prior to installation and transmission to the client computer.

17. The system of claim 16 wherein the unique security module comprises a digital collection of arbitrary functions and dynamic link library pointers.

18. The method of claim 1 wherein the unique security module comprises invalid computer instructions.

19. The method of claim 10 wherein the unique security module comprises invalid computer instructions.

* * * * *